the 
United States Patent [19]

Flat et al.

[11] Patent Number: 5,993,965
[45] Date of Patent: Nov. 30, 1999

[54] FIBRES COATED WITH A HYDROPHOBIC MATERIAL

[75] Inventors: Jean-Jacques Flat, Serquigny; Evelyne Bonnet, La Morlaye, both of France

[73] Assignee: Elf Atochem S.A., France

[21] Appl. No.: 09/024,129

[22] Filed: Feb. 17, 1998

[30] Foreign Application Priority Data

Feb. 18, 1997 [FR] France .................................. 97-01879

[51] Int. Cl.$^6$ ...................................................... D02G 3/00
[52] U.S. Cl. .............................................................. 428/375
[58] Field of Search ............................................... 428/375

[56] References Cited

U.S. PATENT DOCUMENTS 3,864,203 2/1975 Marzocchi .
4,741,773 5/1988 Kuroda et al. ............................. 106/2

FOREIGN PATENT DOCUMENTS 0 244 500 11/1987 European Pat. Off. .
0166926 1/1996 European Pat. Off. .
56-43335 4/1981 Japan .
WO9103498 3/1991 WIPO .

OTHER PUBLICATIONS

French Search Report dated Sep. 23, 1997.

Chemical Abstracts, vol. 91, No. 22, Nov. 26, 1979, Columbus, OH, Abstract No. 176723, T. Kimura et al. "Primary Coating Materials of Optical Fiber".

*Primary Examiner*—Newton Edwards
*Attorney, Agent, or Firm*—Bell, Boyd & Lloyd

[57] ABSTRACT

The invention relates to fibers coated with a hydrophobic material based on an epoxidized polydiene oligomer. This coating results from the photopolymerization of a composition comprising at least one expoxidized polydiene oligomer, at least one photoinitiator salt and optionally a reactive diluent. The invention relates in particular to optical fibers.

5 Claims, No Drawings

FIBRES COATED WITH A HYDROPHOBIC MATERIAL

FIELD OF THE INVENTION

The present invention relates to fibers coated with a hydrophobic material and, more especially, with a material based on an epoxidized polydiene oligomer.

BACKGROUND OF THE INVENTION

The prior art has already described materials for coating optical fibers; for example, WO 91/03498 and EP 166 926 describe photocrosslinkable formulations based on modified polybutadiene oligomers.

WO 91/03498 describes a photocrosslinkable formulation based on a urethane-acrylate prepolymer which is obtained by reacting a hydrogenated hydroxytelechelic polybutadiene with a diisocyanate and then with an unsaturated hydroxyl compound, this prepolymer being subsequently mixed with a reactive diluent of the alkyl acrylate type and with photopolymerization initiators.

EP 166 926 describes the same type of formulation, which is photocrosslinkable under UV irradiation and is composed of a urethane-acrylate oligomer obtained by reaction of a hydroxytelechelic polybutadiene, which is first of all chlorinated and then reacted with a diisocyanate and, finally, with an unsaturated hydroxyl compound, of a reactive diluent of the alkyl acrylate type, and of photoinitiators.

These two references therefore claim optical fiber coating formulations which are photocrosslinkable under irradiation in a process of free-radical polymerization. This technique is known to the skilled worker to have the following disadvantages:

- risk of incomplete crosslinking owing to the impossibility of "Dark Cure", therefore placing limitations on the cycle times of industrial lines
- the presence of odours associated with reactive diluents of the alkyl acrylate type
- high polymerization shrinkage, causing losses in adhesion
- poor peel performance
- inhibition of polymerization by atmospheric oxygen.

A very effective coating has now been found for protecting fibers from moisture.

DESCRIPTION OF THE INVENTION

The aim of the invention is to protect the fibers from the effects of the exterior environment (water, heat, dust, mechanical effects, etc.).

The fibers of the invention are obtained by depositing on existing fibers, by any means, a photopolymerizable composition based on an epoxidized polydiene oligomer.

These existing fibers can be either untreated, i.e. uncoated, or coated already with a product other than that described in the present invention.

Crosslinking is effected by cationic photopolymerization.

The advantage of this process is that it is:

compatible with short cycle times that it shows no inhibition by atmospheric oxygen that "dark cure" is a possibility that it gives flexible and adhering coatings that it is based on formulations devoid of pronounced odor.

The fibers of the invention also have a mechanical behaviour which is improved relative to fibers of the same material which have not been coated with the hydrophobic material described in the present invention.

The invention will now be described in greater detail.

The invention relates to all types of fibers, for example textile, metal or glass fibers.

As far as glass fibers are concerned, mention may be made of optical fibers or of the glass fibers which are used, for example, to reinforce materials. Among textile fibers mention may be made of polyesters, polyamides and polyurethanes. Among metal fibers mention may be made of steel, copper and aluminium.

This hydrophobic material which coats the fibers of the invention is obtained by photopolymerizing a composition comprising at least one epoxidized polydiene oligomer, at least one photoinitiator salt and optionally a reactive diluent.

The epoxidized polydiene oligomer can have a mass Mn of between 500 and 10,000 g/mol, preferably between 1000 and 5000 g/mol. The diene is a conjugated diene which can be chosen from butadiene, isoprene, chloroprene, 1,3-pentadiene and cyclopentadiene. The oligomer is epoxidized on the chain. It can also be functionalized at the chain end by OH or epoxy functions. It may also be partially hydrogenated.

Advantageously, the diene is butadiene.

The epoxidized polydiene oligomer is preferably a polybutadienediol having an OH at each end of the chain (hydroxytelechelic), being epoxidized on the chain and comprising, before epoxydation, from 70 to 80%, preferably 75%, of 1,4 units

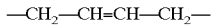
—CH$_2$—CH=CH—CH$_2$— and from 15 to 30%, preferably 25%, of 1,2 or vinyl units

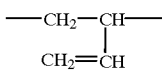

It will not be outside the scope of the invention if, in addition to the conjugated diene, there were vinyl or acrylic comonomers, such as styrene and acrylonitrile. The amount of epoxidized functions of the epoxidized polydiene oligomer can be up to 25% and is preferably between 1 and 8%. The viscosity of the oligomer is advantageously less than 100 Pa·s at 30° C., preferably less than 40 Pa·s at 30° C.

Mention may be made of Poly Bd 600/605 from the company Elf Atochem, Poly Bd R 45 EPI from the company Idemitsu Petrochemical, and Kraton Liquid Polymer EKP 206 and 207 from the company Shell.

The photoinitiator salts are salts capable of producing a strong acid under UV irradiation so as to initiate the cationic polymerization of the system. By way of example, mention may be made of hexafluorophosphorus triarylsulphonium and hexafluoroantimony triarylsulphonium salts.

Electron beam polymerization would not be outside the scope of the invention.

The amount of photoinitiator salt depends on the number of epoxy functions and on the desired rate of polymerization.

The amount of photoinitiator salt can be up to 10 parts per 100 parts of the epoxidized polydiene oligomer and is advantageously between 0.01 and 10 parts.

The composition to be photopolymerized may also comprise a reactive diluent.

The role of the latter is to reduce the viscosity of the epoxidized polydiene oligomers and to increase the weight content of reactive functions.

Mention may be made of the following epoxy resins:

3,4-epoxycyclohexylmethyl 3,4,'-epoxycyclohexanecarboxylate limonene epoxide cyclohexene epoxide 1,2-epoxydodecane.

Mention may be made of the following vinyl ethers:

triethylene glycol divinyl ether 1,4-butanediol monovinyl ether 1,4-bisvinyloxymethylcyclohexane.

The amount of reactive diluent can be up to 500 parts per 100 parts of epoxidized polydiene oligomer, preferably from 0 to 200 parts.

These compositions may also contain additives such as:

solvents plasticizers surfactants for improving the wetting of the coating on the substrate spreading agents devolatilizing agents matting agents rheological agents antioxidants, UV stabilizers for protecting the photopolymerized coating but not interfering with the operation of photopolymerization. Care will be taken to exclude from the formulation any alkaline species, which are known to inhibit cationic polymerization.

The fibers of the invention have very good resistance to hydrolysis, and good mechanical properties. The coating shows excellent adhesion to the fiber. The preparation of these coated fibers is very simple. It has the advantages of cationic photopolymerization, namely dark cure and absence of inhibition by atmospheric oxygen, and allows short cycle times.

In particular, the coating of these fibers does not yield, in contrast to formulations based on petroleum greases.

EXAMPLES

The following products were used:

Epoxidized Polydiene Oligomer:

Poly Bd 605: epoxidized hydroxytelechelic polybutadiene from the company Elf Atochem, having an epoxy content of from 5.5 to 7% and a viscosity of from 200 to 300 P at 25° C.

Photoinitiator Salts:

FX 512: photoinitiator salt from the company 3M, of the triarylsulphonium hexafluorophosphate type.

UVI 6974: photoinitiator salt from the company Union Carbide, of the triarylsulphonium hexafluoroantimonate type.

Reactive Diluents:

1.4-butadienediol monovinyl ether: vinyl ether from the company ISP.

Cyracure UVR 6110: difunctional cycloaliphatic epoxy compound from the company Union Carbide.

Additives:

Fluorad FC 430: fluorinated surfactant from the company 3M

No Air Liquid: devolatilzing agent from the company Barlöcher.

These formulations were crosslinked under UV irradiation using a MINICURE photopolymerization bench from the company PRIMARC.

TABLE 1

Compositions and characteristics

| | 1 | 2 | 3 |
|---|---|---|---|
| COMPOSITION | | | |
| Poly Bd 605 | 100 | 100 | 100 |
| Cyracure UVR 6110 | 51.9 | 70 | 100 |
| Fluorad FC 430 | 0.8 | 0.8 | 0.8 |
| No Air Liquid | | 1.8 | 1.8 |
| FX512 | 6.3 | 6.8 | 8 |
| CHARACTERISTICS | | | |
| Viscosity (30° C.) (mPa · s) | 5500 | 4100 | 2900 |
| Glass transition (DSC) | nd | nd | nd |
| Coating hardness | | | |
| Pencil | 4B | 4B | 4B |
| Persoz | 41 σ 0.8 | 56 σ = 1 | 82 σ = 7 |

The persoz hardness is determined in accordance with NFT standard 30016.

The viscosity of the formulations was measured with the aid of a Brookfield DV III viscometer equipped with a thermostatted chamber.

The glass transition temperature was measured by DSC at the second heating stage with a rate of temperature rise of 10° C./min.

TABLE 2

Compositions and characteristics

| | 4 | 5 | 6 |
|---|---|---|---|
| COMPOSITION | | | |
| Poly Bd 605 | 100 | 85 | 76 |
| Cyracure UVR 6110 | | 15 | |
| 1,4-butanediol monovinyl ether | | | 24 |
| Fluorad FC 430 | | | |
| UVI 6974 | 4 | 4 | 4 |
| CHARACTERISTICS | | | |
| Pencil hardness | 2H | 3H | 3H |
| MEK resistance | 95 | >100 | >100 |

The MEK resistance is determined in accordance with ASTM standard D4752

TABLE 3

Adhesion characteristics

| | 7 |
|---|---|
| COMPOSITION | |
| Poly Bd 605 | 65.5 |
| Cyracure UVR 6110 | 34.5 |
| Fluorad FC 430 | 0.5 |
| FX 512 | 4 |
| CHARACTERISTICS | |
| Adhesion to: | |
| Glass | 5/5 |
| Steel | 4/5 |
| Aluminium | 4/5 |

In Table 3 the adhesion is rated from 0 to 5 in accordance with NFT standard 30038.

Glass Fibers—Mechanical Properties of the Fibers

In these tests we measured the mechanical tensile strength of various glass fibers coated either only with their primary coating (deposited when the fiber was drawn) or, in addition to the primary coating, with a coating of the formulation 3 of Table 1.

TABLE 4

Breaking stresses of the fibres as a function of the coating

| Secondary coating | Breaking stress (N) |
| --- | --- |
| None | + |
| Formulation 3 | ++ |

+ represents good
++ represents very good

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Coated fiber comprising a hydrophobic material based on an epoxidized polydiene oligomer, wherein the coating results from the photopolymerization of a composition comprising at least one epoxidized polydiene oligomer, at least one photoinitiator salt and optionally a reactive diluent.

2. Coated fiber according to claim 1, wherein the diene is a conjugated diene.

3. Coated fibers according to claim 2 wherein the epoxidized polydiene oligomer is a hydroxytelechelic polybutadiene epoxidized on the chain.

4. Coated fiber according to claim 1, wherein the fiber is selected from glass, metal and textile fiber.

5. Coated fiber according to claim 2, wherein the conjugated diene is butadiene.

* * * * *